(12) United States Patent
Venanzi et al.

(10) Patent No.: US 9,767,419 B2
(45) Date of Patent: Sep. 19, 2017

(54) CROWDSOURCING SYSTEM WITH COMMUNITY LEARNING

(71) Applicant: Microsoft Technology Licensing, LLC, Redmond, WA (US)

(72) Inventors: Matteo Venanzi, Southampton (GB); John Philip Guiver, Saffron Walden (GB); Gabriella Kazai, Bishops Stortford (GB); Pushmeet Kohli, Cambridge (GB); Milad Shokouhi, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 658 days.

(21) Appl. No.: 14/162,962

(22) Filed: Jan. 24, 2014

(65) Prior Publication Data

US 2015/0213360 A1 Jul. 30, 2015

(51) Int. Cl.
*G06F 15/18* (2006.01)
*G06N 99/00* (2010.01)
(Continued)

(52) U.S. Cl.
CPC .......... *G06N 99/005* (2013.01); *G06N 5/043* (2013.01); *G06N 7/005* (2013.01); *G06Q 10/06311* (2013.01); *H04L 51/12* (2013.01)

(58) Field of Classification Search
None
See application file for complete search history.

(56) References Cited

U.S. PATENT DOCUMENTS 8,554,605 B2* 10/2013 Oleson ............ G06Q 10/06311
                                                  705/319
8,626,545 B2* 1/2014 Van Pelt .......... G06Q 10/06398
                                                  705/317
(Continued)

FOREIGN PATENT DOCUMENTS

WO 2013142219 A1 9/2013

OTHER PUBLICATIONS

Baba et al., "Leveraging Crowdsourcing to Detect Improper Tasks in Crowdsourcing Marketplaces", Jul. 17, 2013, IAAI, pp. 1-15.*
(Continued)

*Primary Examiner* — Paulinho E Smith
(74) *Attorney, Agent, or Firm* — Lee & Hayes, PLLC

(57) ABSTRACT

Crowdsourcing systems with machine learning are described, for example, to aggregate answers to a crowd-sourced task in a manner achieving good accuracy even where observed data about past behavior of crowd members is sparse. In various examples a machine learning system jointly learns variables describing characteristics of both individual crowd workers and communities of the workers. In various examples, the machine learning system learns aggregated labels. In examples learnt variables describing characteristics of an individual crowd worker are related, by addition of noise, to learnt variables describing characteristics of a community of which the individual is a member. In examples the crowdsourcing system uses the learnt variables describing characteristics of individual workers and of communities of workers for any one or more of: active learning, targeted training of workers, targeted issuance of tasks, calculating and issuing rewards.

22 Claims, 7 Drawing Sheets

(51) Int. Cl.
*G06Q 10/06* (2012.01)
*G06N 7/00* (2006.01)
*G06N 5/04* (2006.01)
*H04L 12/58* (2006.01)

(56) References Cited

U.S. PATENT DOCUMENTS

| | | | | |
|---|---|---|---|---|
| 8,805,845 | B1* | 8/2014 | Li | G06F 17/30958 707/738 |
| 2011/0218946 | A1* | 9/2011 | Stern | H04L 12/1859 706/12 |
| 2011/0314039 | A1* | 12/2011 | Zheleva | G06F 17/30035 707/767 |
| 2012/0005131 | A1 | 1/2012 | Horvitz et al. | |
| 2012/0029963 | A1* | 2/2012 | Olding | G06Q 10/06 705/7.14 |
| 2012/0029978 | A1* | 2/2012 | Olding | G06Q 10/06 705/7.42 |
| 2012/0278263 | A1 | 11/2012 | Borthwick et al. | |
| 2013/0066961 | A1* | 3/2013 | Naik | G06Q 10/10 709/204 |
| 2013/0110498 | A1* | 5/2013 | Bekkerman | G06F 17/2745 704/9 |
| 2014/0156331 | A1* | 6/2014 | Cordasco | G06Q 10/06311 705/7.15 |
| 2014/0236669 | A1* | 8/2014 | Milton | G06Q 30/0201 705/7.29 |
| 2014/0333761 | A1* | 11/2014 | Porter | G06Q 30/06 348/135 |
| 2015/0134304 | A1* | 5/2015 | Guiver | G06Q 10/00 703/2 |
| 2015/0161670 | A1* | 6/2015 | Shen | G06Q 30/0275 705/14.66 |
| 2015/0213360 | A1* | 7/2015 | Venanzi | G06Q 10/06311 706/12 |
| 2015/0356489 | A1* | 12/2015 | Kazai | G06Q 10/06398 705/7.42 |
| 2016/0034840 | A1* | 2/2016 | Venanzi | G06Q 10/06311 705/7.14 |

OTHER PUBLICATIONS

Welinder et al., "Online Crowdsourcing: Rating Annatators and Obtaining Cost-Effective Labels", 2010, IEEE, pp. 25-32.*

Simpson, et al., "Dynamic Bayesian Combination of Multiple Imperfect Classifiers", In Book of Decision Making and Imperfection, Feb. 2, 2013, 36 pages.

Hosseini, et al., "On Aggregating Labels from Multiple Crowd Workers to Infer Relevance of Documents", In Proceeding of the Advances in Information Retrieval—34th European Conference on IR Research, Apr. 1, 2012, vol. 7724, 13 pages.

Sheng, et al., "Get Another Label? Improving Data Quality and Data Mining Using Multiple, Noisy Labelers", In Proceedings of the Fourteenth ACM SIGKDD International Conference on Knowledge Discovery and Data Mining, Aug. 24, 2008, 9 pages.

Raykar, et al., "Eliminating Spammers and Ranking Annotators for Crowdsourced Labeling Tasks", In Journal of Machine Learning Research, vol. 13, Feb. 2012, 28 pages.

Ruvolo, et al., "Exploiting Commonality and Interaction Effects in Crowdsourcing Tasks Using Latent Factor Models", Oct. 30, 2013, Available at: http://www.ics.uci.edu/~qliu1/nips13_workshop/Papers/ActivePaper5.pdf.

Ertekin, et al., "Approximating the Wisdom of the Crowd", Published on: Mar. 17, 2013, Available at: http://web.mit.edu/seyda/www/Papers/NIPS11Workshop_ApproximatingWC.pdf.

Dekel, et al., "Vox Populi: Collecting High-Quality Labels from a Crowd", In Proceedings of the 22nd Annual Conference on Learning Theory, Jun. 2009, 10 pages.

Liu, et al., "TrueLabel + Confusions: A Spectrum of Probabilistic Models in Analyzing Multiple Ratings", In Proceedings of the 29th International Workshop on Conference Machine Learning, Jun. 26, 2012, 8 pages.

Loni, et al., "Crowdsourcing for Social Multimedia at MediaEval 2013: Challenges, Data set, and Evaluation", In Proceedings of the MediaEval Workshop, Oct. 18, 2013, 2 pages.

Lease, Matthew, "On Quality Control and Machine Learning in Crowdsourcing", In Proceedings of the Human Computation: Papers from the AAAI Workshop, Aug. 2011, 6 pages.

Chen, et al., "Pairwise Ranking Aggregation in a Crowdsourced Setting", In Proceedings of the Conference Series Web Search and Data Mining, Feb. 4, 2013, 10 pages.

Ghahramani, et al., "Bayesian Classifier Combination", In Fifteenth International Conference on Artificial Intelligence and Statistics, Apr. 21, 2012, 9 pages.

Psorakis, et al., "Overlapping Community Detection using Bayesian Nonnegative Matrix Factorization", In Journals of Physical Review E, vol. 83, Issue 6, Jun. 22, 2011, 9 pages.

Simpson, et al., "Dynamic Bayesian Combination of Multiple Imperfect Classifiers", In Workshop on Human Computation for Science and Sustainability, Jan. 14, 2013, 36 pages.

* cited by examiner

CROWDSOURCING SYSTEM WITH COMMUNITY LEARNING

BACKGROUND

Crowdsourcing systems (also referred to as crowdsourcing platforms) are increasingly available and are used to offer tasks to individuals or teams over the internet or using other communications methods. The tasks being offered may be labeling or ranking tasks whereby individuals classify items into classes or ranges. For example, to classify an email as being spam or not, to rate a movie, to classify a document as belonging to one of a several possible categories, to rate the relevance of a search result, and others.

For a given task, a crowdsourcing platform may receive answers completing the task from a number of different individuals in a crowd of potential participants. The individuals may be referred to as workers. The received answers differ from one another because of variation between the workers (for example, some workers are experts, some novices, some unmotivated). The crowdsourcing platform then has the problem of how to convert all the received answers for a given task into a single answer. This is difficult because of the uncertainty in the trustworthiness of individual workers and the quality of the crowdsourced answers overall. For example, workers might be unreliable and may provide incorrect answers depending on their skills, expertise and motivations. In addition, they may be unintentionally biased towards particular answers. For example, in tasks where a rating is required, certain workers may be overly conservative and always give medium scores, whilst others may be overly opinionated and always give extreme scores. These problems make the task of aggregating answers and obtaining a consistent answer challenging, particularly when there are too few answers.

Existing machine learning approaches for aggregating crowdsourced answers may give poor results where only a small amount of observed data is available about the behavior of individual crowd workers. This is a significant problem because in many real applications it is expensive to acquire enough data to learn about each worker and to estimate the true label, taking into account the estimated trustworthiness or quality of each worker. For example, there is a cost per worker per task. In addition, most workers in crowdsourcing only typically complete a small number of tasks, resulting in high uncertainty about their work quality.

Scalability of machine learning systems is another issue that typically arises for many real world applications. Training needs to be carried out and this is typically a time consuming and computationally resource intensive task. There is an ongoing need to improve the training process.

The embodiments described below are not limited to implementations which solve any or all of the disadvantages of known crowdsourcing systems.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Crowdsourcing systems with machine learning are described, for example, to aggregate answers to a crowdsourced task in a manner achieving good accuracy even where observed data about past behavior of crowd members is sparse. In various examples a machine learning system jointly learns variables describing characteristics of both individual crowd workers and communities of the workers. In various examples, the machine learning system learns aggregated labels. In examples learnt variables describing characteristics of an individual crowd worker are related, by addition of noise, to learnt variables describing characteristics of a community of which the individual is a member. In examples the crowdsourcing system uses the learnt aggregated labels and/or the learnt variables describing characteristics of individual workers and of communities of workers for any one or more of: active learning, targeted training of workers, targeted issuance of tasks, calculating and issuing rewards.

In examples the machine learning system comprises a probabilistic graphical model comprising a plurality of sub-models whereby a message passing schedule is facilitated for fast, efficient training with web-scale data.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a crowdsourcing system for rating search results from different information retrieval systems, the system described is provided as an example and not a limitation. As those skilled in the art will appreciate, the present examples are suitable for application in a variety of different types of crowdsourcing system where other tasks are crowdsourced, including but not limited to: classification tasks such as image classification, ranking tasks such as search result relevance ranking, movie rating, product rating; or other tasks involving human intelligence and typically where no ground truth answers are readily available for the tasks. The aggregated label data from the crowdsourcing system may, in some examples, be used to train a downstream system such as an information retrieval system, spam email filter, medical image analysis system, document storage system or other equipment which is then itself used for ongoing operation. In addition, the models learned for the crowd workers may be used to identify spammers and classes of spam.

Figure 1:
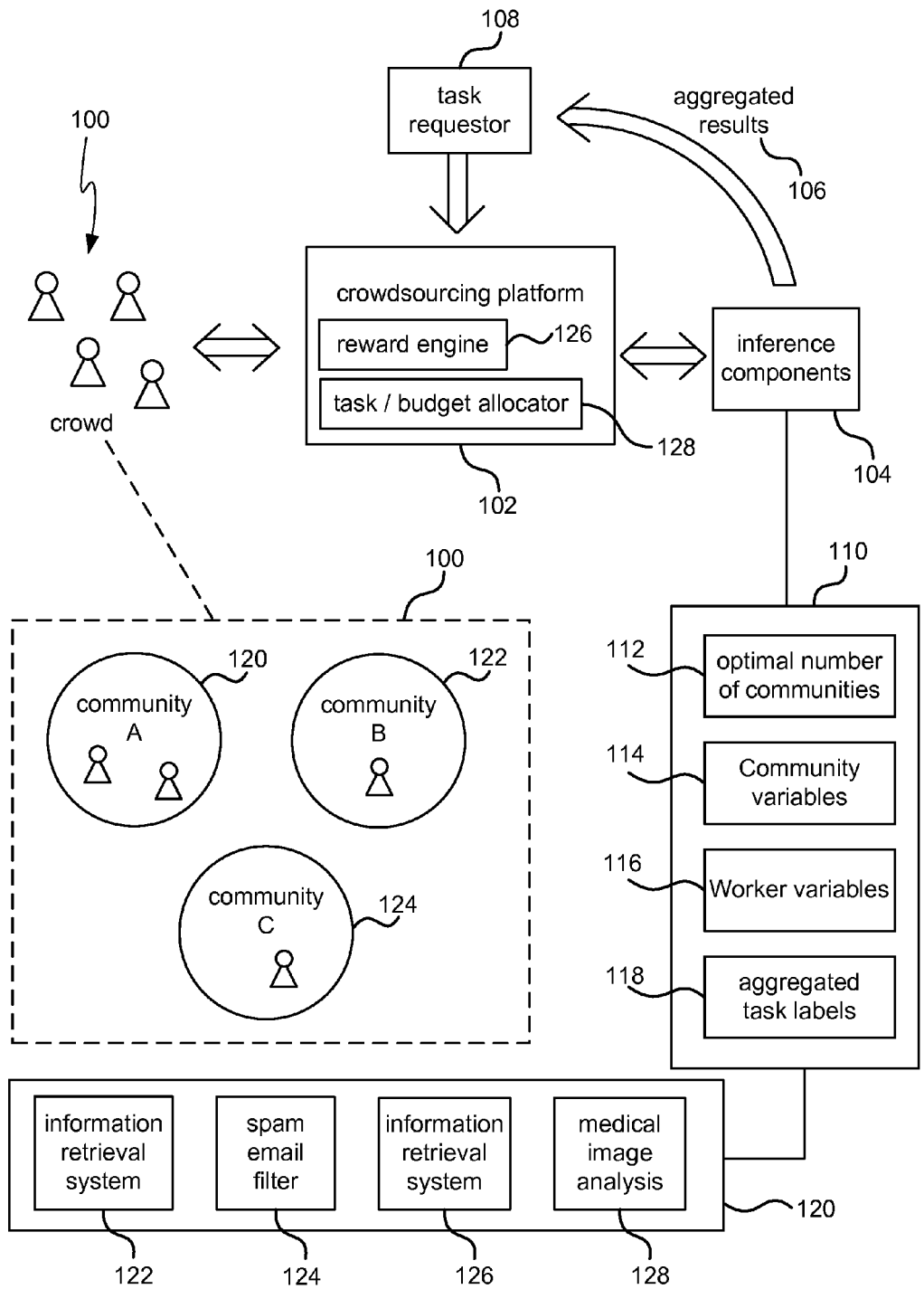
FIG. 1 is a schematic diagram of a crowdsourcing platform in communication with machine learning inference components.

FIG. 1 is a schematic diagram of a crowdsourcing platform 102 in communication with a task requestor 108 and inference components 104. The crowdsourcing platform 102, task requestor 108 and inference components 104 are each computer implemented using software and/or hardware and are in communication with one another over a communications network of any suitable type. The crowdsourcing platform is arranged to publish tasks to a crowd 100 of potential participants in the task. The potential participants may be individual people, referred to as workers, who are able to view tasks published by the crowdsourcing platform 102 and to submit answers to the published tasks. The submitted answers are referred to as observed workers' labels and are sent to the inference components 104. For example, the crowdsourcing platform may serve web pages publishing the tasks and the individuals in the crowd 100 may have end user computing equipment enabling them to submit answers to the published tasks. However, it is not essential to use web-based communications. The crowdsourcing platform 102 may publish the tasks in other ways, for example, by sending email messages, and may receive answers in any suitable automated manner over a communications network. In the example of FIG. 1 only four individuals are shown in the crowd 100 for clarity; in practice hundreds of thousands or millions of individuals may be in the crowd 100.

The crowd 100 may be considered as comprising a plurality of communities 120, 122, 124 where each community comprises one or more crowd members who exhibit similar characteristics. For example, a community may comprise crowd members observed to have similar biases when completing a particular type of crowdsourced task. However, it is not straightforward to find the communities as these are unknown. The communities may be defined in many different ways and may be considered "virtual" communities rather than physical communities. The examples described herein demonstrate how to find such communities that are helpful to achieve various tasks such as learning aggregated labels faster, characterizing individual crowd workers and carrying out active learning.

The crowdsourcing platform 102 observes task events and passes the observed data to the inference components 104. The observed data comprises at least the answers to the tasks (the observed workers' labels), data about the tasks (such as a task identifier), and crowd member references. In some examples additional features of the tasks and/or crowd members may be used where appropriate consent of crowd members is given. The observed data is used to carry out inference at inference components to infer aggregated labels, community characteristics and worker characteristics. The crowdsourcing platform 102 comprises a reward engine 126 and a task/budget allocator 128. The reward engine is able to calculate and issue rewards using information from the task requestor 108 as well as learnt data output 110 from the inference components. For example, communities of workers found to be motivated and unbiased may receive more rewards. The task/budget allocator is able to select communities and/or workers to issue tasks to on the basis of the learnt data, rules, criteria and budgets received from the task requestor 108.

For any given task, the crowdsourcing platform 102 receives a plurality of answers from different crowd members. The plurality of answers are to be aggregated to obtain a single answer (optionally together with a measure of uncertainty of the aggregated answer relative to other possible answers) in an intelligent manner (taking into account learnt data) which gives accurate results. In some examples a probability vector is calculated which gives the probability of each possible answer being the correct one. Accuracy of the results may be assessed by comparison with ground truth data where that is available. For example, answers obtained from expert, non-biased, human judges may be used as ground truth data. The inference components 104 are used to carry out the intelligent aggregation process in order to output aggregated task labels 118 also referred to as aggregated answers.

The potential outputs 110 of the inference components 104 comprise at least: the aggregated task labels 118, and learnt data comprising: an optimal number of communities in the crowd 100, one or more variables describing community characteristics 114, one or more variables describing worker characteristics 116.

Previous machine learning systems for crowdsourcing have treated crowd workers independently, or have attempted to cluster crowd workers with similar behavior or observed attributes as a post processing step, after machine learning has taken place. However, in the examples described herein similarities between crowd workers are learnt, jointly with crowd worker characteristics, during machine learning. For example, characteristics of an individual crowd worker are modeled as being related, through addition of noise, to characteristics of a community of crowd workers of which the individual is a member. The resulting machine learning system may give greatly improved accuracy as compared with previous machine learning systems in situations where observed data per worker is sparse. For example, learnt characteristics of a worker for whom there is little observed data are seeded from learnt characteristics of a community. The characteristics of the community often are more certain because more observed data is available for the community than for the individual worker. Even with a small amount of data for a given worker may be a sufficient cue to determine which community the worker is in.

In some examples, the characteristics of the communities and the workers may be represented as latent variables in a probabilistic model. Probability distributions representing belief about the variables may be initialized to default values and updated during machine learning update processes as data is observed by the crowdsourcing platform 102. The probabilistic model may be represented at a high level as a graphical model such as that illustrated in FIG. 5. Inference algorithms compiled from the graphical model are used to update the probability distributions representing belief about the latent variables. In this way information about believed values of the latent variables, and about certainty of the belief of those values, is obtained.

As shown in FIG. 1 a task requestor 108 may be used to send tasks to the crowdsourcing platform 102 for publishing.

The task requestor may be an information retrieval system for example or any other type of system which has labeling, ranking or other human intelligence tasks to be completed. Aggregated results 106 from the inference components 104 may be returned to the task requestor 108 by the inference components 104 and/or crowdsourcing platform 102.

As mentioned above, the aggregated label data from the crowdsourcing system may, in some examples, be used to train a downstream system 120 such as an information retrieval system 122, spam email filter 124, medical image analysis system 128, document storage system 126, or other equipment which is then itself used for ongoing operation. For example, aggregated label data about relevance of search results may be used to update an index of an information retrieval system which is then used to retrieve more relevant results in response to future queries. For example, aggregated email spam/not spam labels may be used to train a spam email filter 124 which is then better able to identify incoming email it receives as spam or not and block the email accordingly. For example, aggregated document category labels may be used to train a document storage system 126 to store documents in appropriate categories and enable those to be retrieved more easily using category searches. For example, aggregated labels of medical images may be used to train a medical image analysis system 128 to automatically classify future images and trigger alerts on the basis of the classifications. These examples of downstream systems 120 are only some of a wide range of other possible downstream systems which may be trained using aggregated labels of human intelligence tasks.

Figure 2:
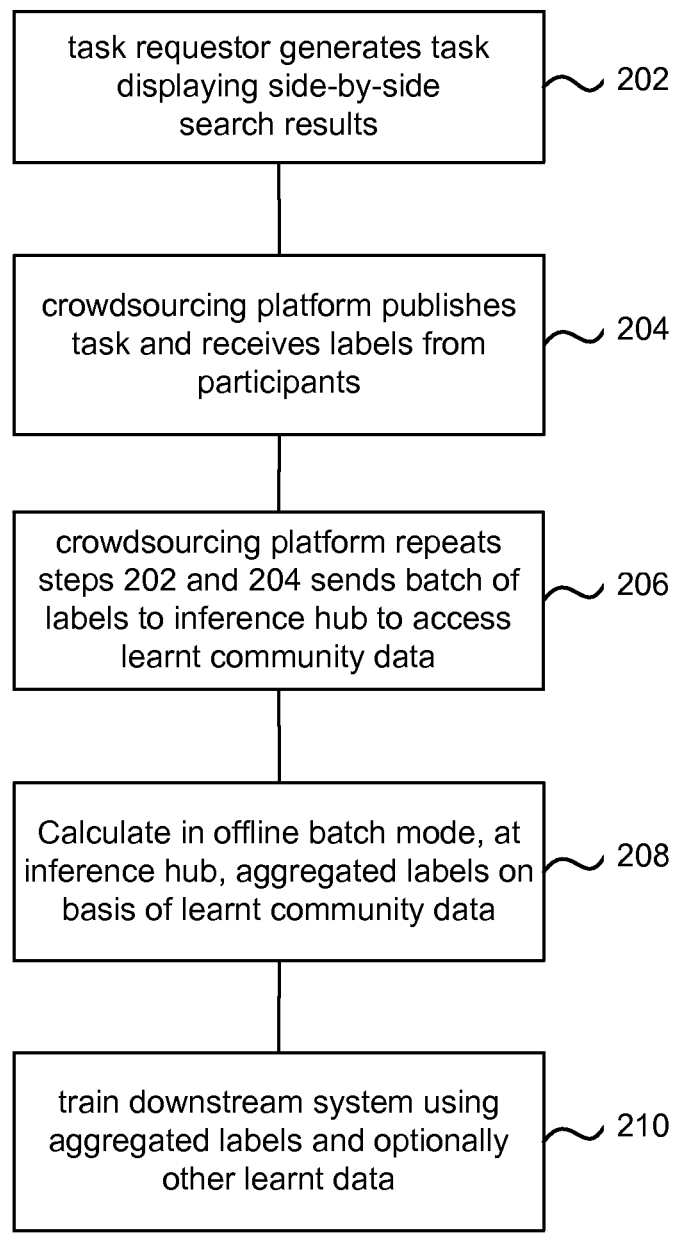
FIG. 2 is a flow diagram of a method using the crowdsourcing platform of FIG. 1.

FIG. 2 is a flow diagram of a method at the crowdsourcing system of FIG. 1 for aggregating labels of human intelligence tasks involving rating search results from two different information retrieval systems. For example, a search query is submitted to each of two different information retrieval systems and the results from the first information retrieval system are displayed on a left hand side of a display and the results from the second information retrieval system are displayed on a right hand side of the display. The crowd worker is asked to label the results on the left hand side as being better, the same or worse than the results on the right hand side. The task requestor generates 202 a task which is to label the left hand side search results as being better, the same or worse. The task is sent to the crowdsourcing platform together with any criteria and/or budgets to be applied. For example, the criteria may specify a degree of diversity required in the crowd members to be issued the task and/or may specify a quota of crowd members to be issued the task. The crowdsourcing platform publishes 204 the task to crowd members it selects according to the received criteria, budgets and any rules it has. The crowdsourcing platform receives labels from a plurality of the crowd members in response to the published task.

The method of FIG. 2 may operate in an offline batch mode whereby batches of tasks and associated crowdsourced labels are stored and passed to the inference components for offline inference.

The crowdsourcing platform sends 206 observed data (in batches, where offline batch mode is used) about the task event(s) to the inference components (also referred as the inference hub). The observed data about the task event(s) comprises at least an identifier of the task(s), references of the crowd members that generated labels, and the labels. The inference hub uses the observed data to infer worker variables, community variables, and aggregated labels.

The inference hub calculates (infers) 208 aggregated labels from the received labels on the basis of previously learnt data. In this way the aggregated labels take into account for example, learnt biases of worker communities and learnt biases of individual workers. The aggregated labels may be used to train 210 a downstream system as explained above with reference to FIG. 1.

The method of FIG. 2 may also be adapted for incremental learning by sending the observed labels as a stream to the inference components for online inference rather than sending those in batches.

Figure 3:
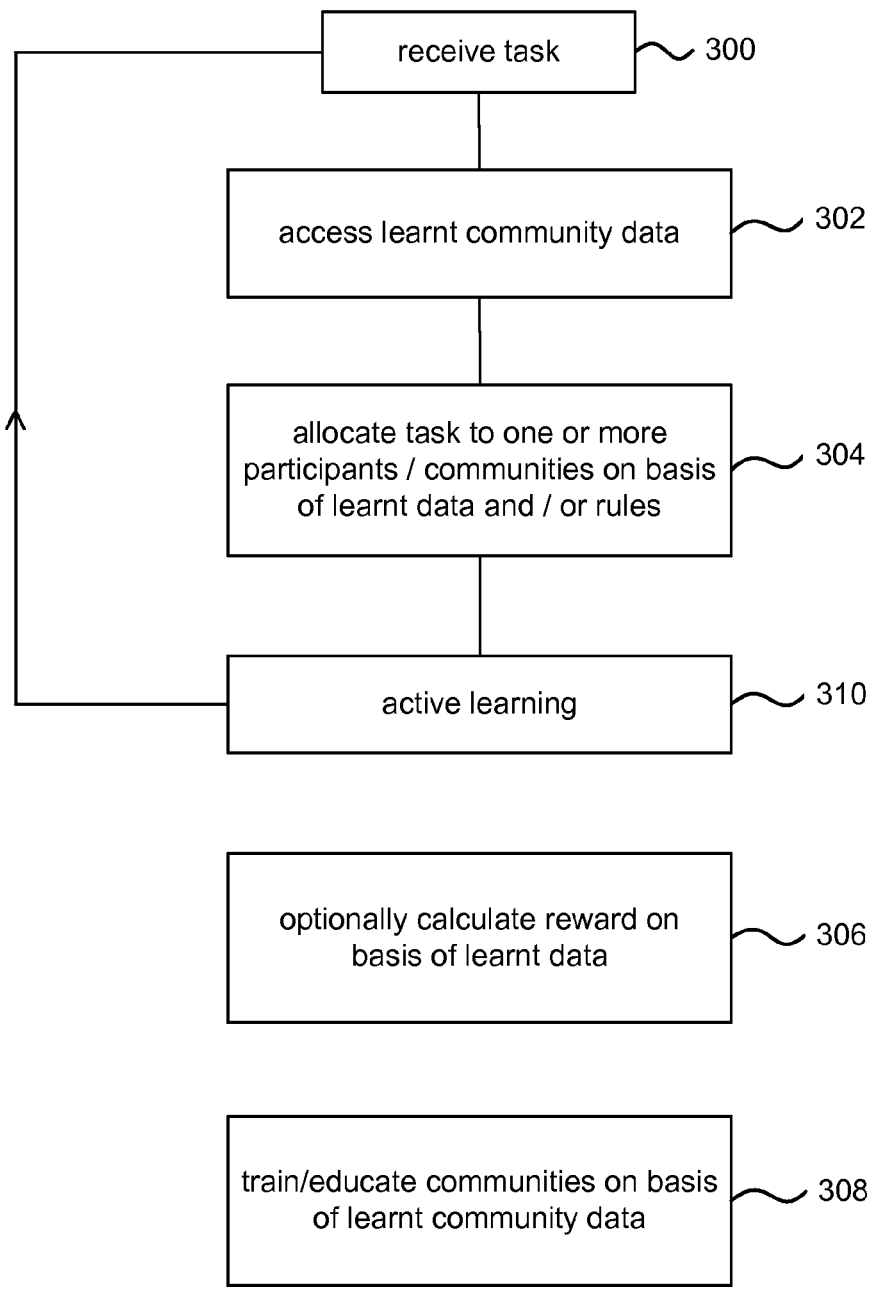
FIG. 3 is a flow diagram of a method at the crowdsourcing platform of FIG. 1 for allocating tasks, issuing rewards, training workers, active learning.

FIG. 3 is a flow diagram of a method at the crowdsourcing platform of FIG. 1 for one or more of: allocating tasks, issuing rewards, training workers, active learning. These are examples of various ways in which data learnt by the inference components may be used by the crowdsourcing platform. For example, a task is received 300 at the crowdsourcing platform from the task allocator. The crowdsourcing platform accesses 302 learnt data comprising community characteristics and/or worker characteristics. The crowdsourcing platform is arranged to allocate the received task to selected workers and/or selected communities of workers in the crowd on the basis of the accessed learnt data. The crowdsourcing platform may also take into account budgets, criteria and rules when selecting the workers and/or communities of workers to issue the task to. It may also be used to set reward/penalty policies based on the performance of the crowd.

The crowdsourcing platform may calculate a reward for completion of the task on the basis of the learnt community data. For example the reward may be calculated on a per-worker basis or on a per-community basis. The reward calculation is shown as a separate block in FIG. 3.

The crowdsourcing platform may use the accessed learnt data to identify training/education needs of individual workers and/or communities of workers. Once the training needs are identified the crowdsourcing platform may provide suitable training to meet those needs. This is shown as a separate block in FIG. 3 as it may occur at intervals.

The crowdsourcing platform may use the accessed learnt data to identify individuals and/or communities for which uncertainty of the learnt characteristics is above a threshold level. Active learning 310 may then be achieved. The crowdsourcing platform may actively seek observed data which will enable the uncertainty of those learnt characteristics to be reduced. For example, by prioritizing training updates using observed data from selected workers and/or selected communities.

Figure 4:
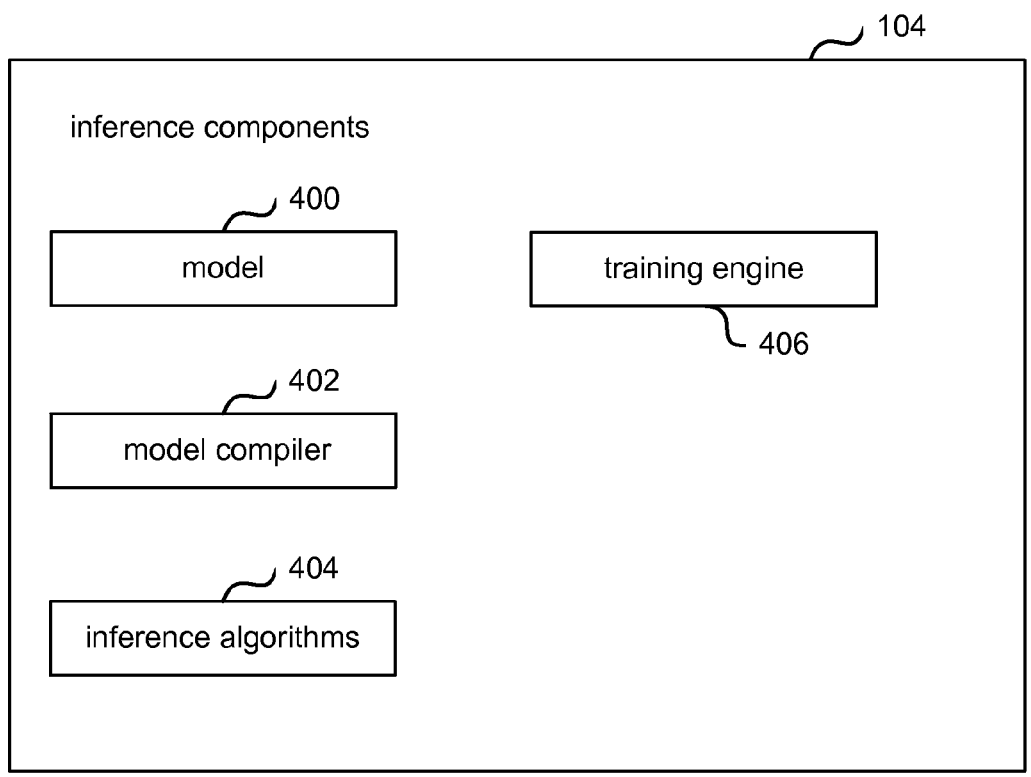
FIG. 4 is a schematic diagram of the inference components of FIG. 1 in more detail.

FIG. 4 is a schematic diagram of the inference components of FIG. 1 in more detail. The inference components 104 comprise a model 400 representing observed variables as well as relationships between latent (unobserved) variables describing characteristics of individual workers and latent variables describing characteristics of communities of workers. In examples, the model 400 describes a process whereby worker labels are generated. In some examples the model is a probabilistic graphical model.]

In some examples the model 400 is a high level representation from which inference algorithms 404 are compiled using a model compiler 402. It is not essential to use the model 400 and the model compiler 402 as in some examples the inference algorithms 404 may be pre-configured. That is, the model compiler 402 is not essential as the inference algorithms may be hand-coded and stored at the inference components. The inference algorithms may use any suitable inference techniques including but not limited to MCMC and variational methods.

The inference components comprise a training engine 406 which accesses observed data from the crowdsourcing platform and uses that to manage a training process (using the inference algorithms) which may comprise any combination of one or more of offline training, online training and online batch training.

In some examples the model 400 is a probabilistic graphical model.

Figure 5:
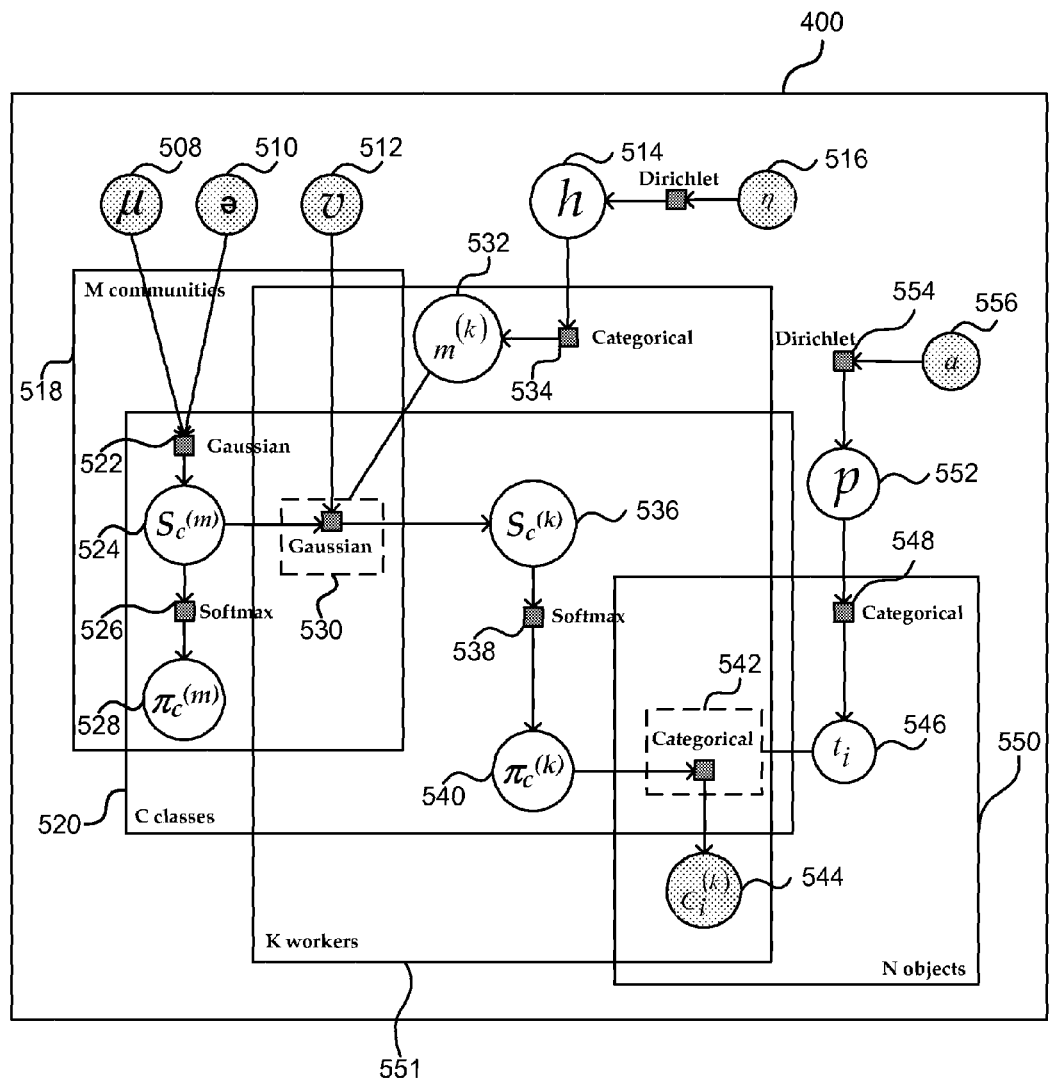
FIG. 5 is an example probabilistic graphical model for use in the inference components of FIGS. 1 and 4.

A probabilistic graphical model is a collection of nodes connected by edges (also referred to as links). The example described with reference to FIG. 5 is a probabilistic graphical model referred to as a factor graph where the square nodes ("factor nodes") comprise factors, which represent deterministic or stochastic computations, and the round nodes ("variable nodes") represent variables in the model. Each factor node encodes dependencies between the variables that are attached to it. The product of all the factors represents the full relationship between all variables in the model. The structure of the probabilistic graphical model (that is the way the nodes are interconnected) is arranged in the examples described herein so that latent (unobserved) variable nodes describing individual worker characteristics are related to at least one latent variable node describing community characteristics of a community the individual worker is believed to be a member of. The probabilistic graphical model may comprise plates which are replicated parts of the model. The probabilistic model may comprise gates as described in more detail below.

Where the model 400 is a probabilistic graphical model, the inference components 104 may comprise any software framework which is able to receive a probabilistic graphical model and compile that to produce inference algorithms that may be applied to the observed data from the crowdsourcing platform. (Note that the compiler is not essential; it is also possible to hand-code the inference algorithms). For example, a software framework which implements exact inference, a software framework which implements sampling, the Infer.NET software framework or others. In some examples the software framework comprises functionality to enable parts of a probabilistic model to be switched on or off based on selector variables. For example, the infer.NET software framework comprises gates functionality which provides this type of switching ability. The inference engine may also comprise functionality to group elements of a probabilistic graphical model together into plates.

The model compiler 402 may compile the probabilistic graphical model 400 and so derive inference algorithms 404. Alternatively, the inference algorithms may be pre-configured.

The inference algorithms are executed in order that inference is carried out using the observed data. In this way belief about the community variables and the worker variables of the model is updated. The inference components produce probability distributions of the variable nodes of the probabilistic graphical model.

FIG. 5 is an example of a probabilistic graphical model which may be used as model 400 in FIG. 4. This is an example only and many other forms of probabilistic graphical model may be used where worker variables are related to community variables. In FIG. 5 the unshaded circular nodes 514, 524, 528, 532, 536, 540, 546, 552, represent latent (unobserved) variables which are to be learnt. The square nodes represent factors or computational units. In FIG. 5 the types of computation applied by the various factors are written next to the factor nodes 522, 526, 530, 534, 538, 548, 554. The shaded circular nodes represent either observed variables or prior knowledge such as knowledge about a range of values a variable may take, or knowledge that a variable must meet specified constraints. For example, prior knowledge may be used to inform inference about the number of communities and/or the composition of the communities.

The example of FIG. 5 may be modified by introducing a factor to ensure that the inferred communities under the model do not deviate too much in terms of their composition from prior knowledge about clusters of the workers obtained from a separate clustering process.

The probabilistic graphical model of FIG. 5 comprises plate 550 which contains nodes representing random variables representing the characteristics of a task (also referred to as an object). In plate 550, node 544 represents observed variable C representing the class (or label) assigned to the object i (task) by a worker k. Node 546 represents random variable t which represents the true class of the object i (which is the aggregated label). Plate 550 is replicated for each task.

The probabilistic graphical model of FIG. 5 also comprises plate 551 which contains nodes representing random variables describing belief about characteristics of a worker k. Plate 551 comprises latent random variable node 532 representing which community m the worker k is a member of. Plate 551 is replicated for each worker.

The probabilistic graphical model of FIG. 5 also comprises plate 518 which contains random variable nodes representing characteristics of a community. Plate 518 comprises latent random variable nodes 524 and 528. Random variable node 528 represents the row of confusion matrix for true label c and community m, and random variable node 524 represents the log of node 528. Plate 518 is replicated for each community. A confusion matrix may be a 2D array representing the biases of a worker, or a community of workers. For example, the rows and columns are indexed by the possible label values, with an entry representing the probability that the worker or community will pick that column's label given the true label as represented by the row. A confusion matrix is an example of a variable describing a worker or a community characteristic. It is not essential to use confusion matrices as other types of variables describing worker or community characteristics may be used, for example variables representing various qualities of the worker or community such as decisiveness or accuracy. For a given class, the community score variable relates to a row of the community confusion matrix. For a given class the worker score variable relates to a row of the worker confusion matrix.

The probabilistic graphical model of FIG. 5 also comprises plate 520 which contains nodes representing variables describing a class (a label category that may be assigned to a task). For example, in the side-by-side search results example of FIG. 2 there are three possible classes. Plate 520 is replicated for each possible class.

The community score variable 524 receives input from variable nodes 508, 510 via factor node 522. Variable nodes 508 and 510 represent knowledge about the community score variable which is assumed to apply, for example, that values in each row sum to 1. Variable nodes 512, 516 and 556 also represent knowledge or constraints that are assumed to apply.

The dashed rectangles 530, 542 represent gates which are switched on or off depending on the value of the random gating variable (the variable that is attached to the edge of the gate). The community that a given worker is a member of is represented by variable 532 and this gates which community plate the worker plate is derived from for each class. The community score variable 524 for the worker is used by the factor node within gate 530 to generate the worker score 536, in this example by adding Gaussian noise. The worker score variable 536 is used by factor node 538 to produce worker confusion matrix 540. The true label gates which row of the worker confusion matrix is used to generate the observed label 544.

The model of FIG. 5 is now described more formally using mathematical notation. Bold symbols are used to denote sets, vectors and matrices in the following text.

Consider that there are K workers classifying N objects into C possible classes. Let $t_i$ be the latent true class (the aggregated label) of object i. Let $\pi_{c,j}^{(k)}$, with c; j ∈C, be the probability that worker k will classify an object of class c as j. Finally, $c_i^{(k)}$ is the label submitted by worker k for the object i and C is the set of all the observed labels. For simplicity of notation, in what follows assume a dense set of labels in which all the workers label all the objects. However, the model implementations described herein also support sparsity in the label set.

The true class, $t_i$, of an object i is generated from a categorical distribution with parameters p:

$$t_i | p \sim \text{Cat}(t_i | p)$$

where p denotes the class proportions across all the objects.

The label, $c_i^{(k)}$, submitted by worker k for object i is then generated from a categorical distribution with parameters $\pi_c^{(k)}$ conditional on the latent true class:

$$c_i^{(k)} | \pi^k, t_i \sim \text{Cat}(C_i^{(k)} | \pi_{t_i}^{(k)})$$

where $\pi^{(k)} = \{\pi_1^{(k)}, \ldots, \pi_c^{(k)}\}$ is the set of row probability vectors representing the confusion matrix of worker k.

The model of FIG. 5 assumes that there are M communities of workers within the crowd. Each community m is associated with a confusion matrix $\pi^{(m)}$. Let $m^{(k)}$ be the community membership of worker k. Then, assume that $m^{(k)}$ is generated from a categorical distribution with parameters h:

$$m^{(k)} | h \sim \text{Cat}(m^{(k)} | h)$$

where h represents the proportions of community memberships across the workers. Further, each community has a probability score $s_c^m$ representing the log probability vector of the $c^{th}$ row of the confusion matrix $\pi^{(m)}$ of community m. Apply a softmax operator to the community score for all the classes c to derive a normalised exponentiated version of $s_c^m$, which is referred to herein as a row of the community confusion matrix $\pi_c^{(m)}$:

$$p(\pi_c^{(m)} | s_c^m) = \delta(\pi_c^{(m)} - \text{softmax}(s_c^m))$$

Here δ is the Dirac delta function imposing the equality constraint between $\pi_c^{(m)}$ and the deterministic softmax function of $s_c^m$.

In the example of FIG. 5 the model encodes the relationship between the confusion matrix of the community and the workers that belong to it. That is, each worker k has an individual score vector $s_c^{(k)}$, one for each class c, generated from the score vector $s_c^{(m^{(k)})}$ of the community $m^{(k)}$ (i.e. the worker k's community score), through a multivariate Gaussian draw:

$$s_c^{(k)} | s_c^{(m^{(k)})} \sim \mathcal{N}(s_c^{(k)} | s_c^{(m^{(k)})}, v^{-1}I)$$

where v is a hyperparameter representing the isotropic inverse variance of the worker confusion matrix rows within a community. From this, $\pi_c^{(k)}$ is derived as the normalised exponentiated version of $s_c^{(k)}$, i.e. the softmax of $s_c^{(k)}$. Formally:

$$p(\pi_c^{(k)} | s_c^k) = \delta(\pi_c^{(k)} - \text{softmax}(s_c^k))$$

$c_i^k$ is generated by a categorical distribution conditioned on $\pi_{t_i}^{(k)}$ i.e. the row of the confusion matrix $\pi^{(k)}$ is conditioned on the true latent label $t_i$.

To train the model of FIG. 5 observed data from the crowdsourcing platform is used to populate observed class variable 544 and updates are made to probability distributions representing the beliefs of the latent variables. This is achieved using message passing algorithms. The message passing algorithms may be stored at the inference components.

The updated probability distributions representing beliefs of the latent variables may be accessed at any stage and provide the learnt data described above. For example, probability distributions describing belief about the true aggregated labels t, belief about worker and community scores and belief about community membership of workers.

A detailed example of how inference is performed in the model of FIG. 5 is now given.

Assume that the class assignments of objects from workers (denoted by C) are observed. Given C, the inference components infer the posterior distributions of the set of the parameters: $\Theta = \{s^m, \pi^{(m)}, s^{(k)}, \pi^{(k)}, t, p\}$ This is achieved by applying Bayes' theorem to compute the joint posterior distribution of Θ conditioned on C:

$$p(\Theta|C) \propto p(C|\pi^{(k)},t) p(t|p) p(p) p(\pi^{(k)}|s^{(k)}) p(s^{(k)}|s^{(m^{(k)})}) p(m^{(k)}|h) p(h) p(s^{(m^{(k)})})$$

The priors for the parameters h and $s_m$ may be specified by the following conjugate distributions:

$$h|\alpha \sim \text{Dir}(h|\alpha)$$

$$s_c^{(k)} | \theta \sim \mathcal{N}(s_c^{(k)} | \mu, \theta^{-1}I)$$

That is, the prior for h is a Dirichlet distribution with parameters α while the prior for $s_c^{(k)}$ is a multivariate Gaussian distribution with mean μ and isotropic precision θ. Assuming that labels are generated independently, and incorporating the expressions of the model distributions described above, the following expression for the joint posterior distribution is obtained:

$$p(\Theta|C) \propto \text{Dir}(p|\alpha) \pi_{i=1}^N \{\text{Cat}(t_i|p) \pi_{k=1}^K \{\text{Cat}(c_i^{(k)}|\pi_{t_i}^{(k)})$$

$$\delta(\pi_{t_i}^{(m^{(k)})} - \text{softmax}(s_{t_i}^{(m^{(k)})})) \text{Dir}(h|\alpha)$$

$$\mathcal{N}(s_{t_i}^{(k)} | s_{t_i}^{(k)}, v^{-1}I) \mathcal{N}(s_{t_i}^{(m^{(k)})} | \mu, \theta^{-1}I) \text{Cat}(m^{(k)}|h)\}\}$$

To compute the approximate marginal distribution of each parameter, variational message passing algorithms may be used. Finally, to find the optimal number of communities M*, the maximum marginal likelihood model selection criterion may be used. This may be computed through marginalizing out the parameters in Θ. Formally:

$$M^* = \arg\max_M \int_\Theta p(C|\Theta,M) p(\Theta) d\Theta$$

Figure 6:
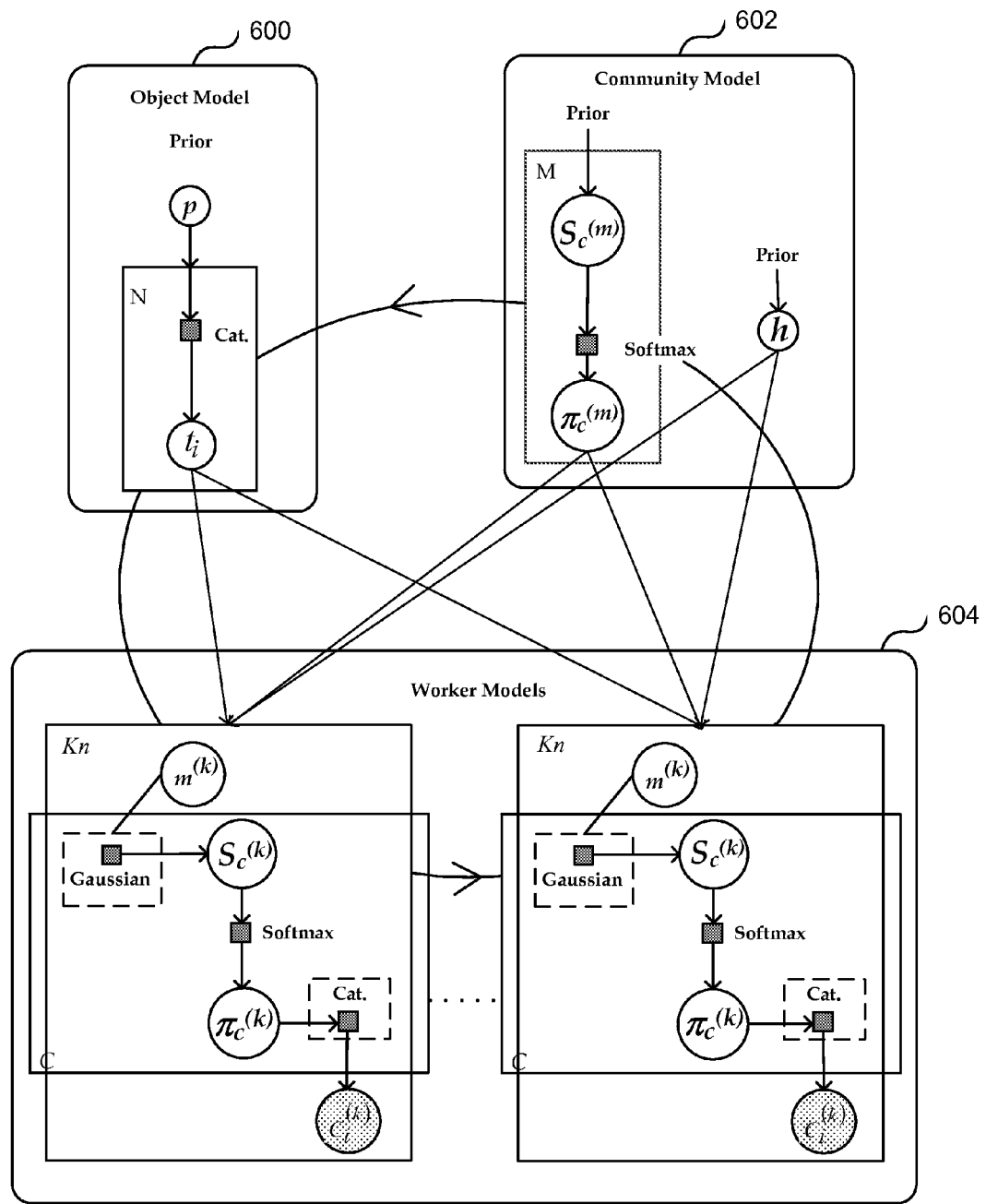
FIG. 6 is a schematic diagram of the probabilistic graphical model of FIG. 5 divided into sub-models to facilitate message passing schedules used in training.

FIG. 6 is a schematic diagram of a scalable implementation of the model of FIG. 5 whereby the model of FIG. 5 is split into sub-models. This model decomposition implementation technique enables the inference components to be trained on large-scale data sets (e.g. hundreds of thousands or millions of labels).

In FIG. 6 the model is split into three sub-models: object model 600, community model 602 and a set of worker models 604. This enables the inference components to run (cheaper) local inference in each sub-model, and merge the post-inference results using standard message passing calculations. To define the user models, split the set of workers K into a complete and disjoint partition: $K=\{K_1, \ldots, K_I\}$. Each subset $K_i$ is associated with a single worker model instance which infers the variables $\pi^{(k)}$ and $s^{(k)}$ for the workers in $K_i$. The object model infers the variables $t_i$ and $p$ of all the objects. Similarly, the community model infers the variables $h$, $s^{(k)}$ and $\pi^{(k)}$ of all the workers.

The three models are connected together through the probabilistic relationships between $t_i$ and $\pi^{(k)}$ and between $s^m$ and $s^k$, as described above. To run inference in this model architecture, iteratively run the inference message passing algorithm in each of the three sub-models in a scheduled order and repeat this process until all the merged posterior distribution convergences. The factor graph and the inference schedule of this scalable implementation is depicted in FIG. 6.

The type of implementation described with respect to FIG. 6 has several benefits in terms of scalability. First, the space complexity is reduced by running local inference in simpler sub-models and merging the results using only a few messages exchanged between the connecting factors. Second, it is possible to parallelise the computation of each sub-model with an evident saving of time complexity. Using just the first of these techniques, it has been demonstrated that it is possible to train the model of FIG. 6 on a dataset of 722,970 data points in approximately 20 minutes on a standard machine with 3.60 GHz CPU and 16 GB RAM.

The inference components may be computer implemented using software and/or hardware. In some examples the inference components are implemented, in whole or in part, using one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), graphics processing units (GPSs) or other.

Figure 7:
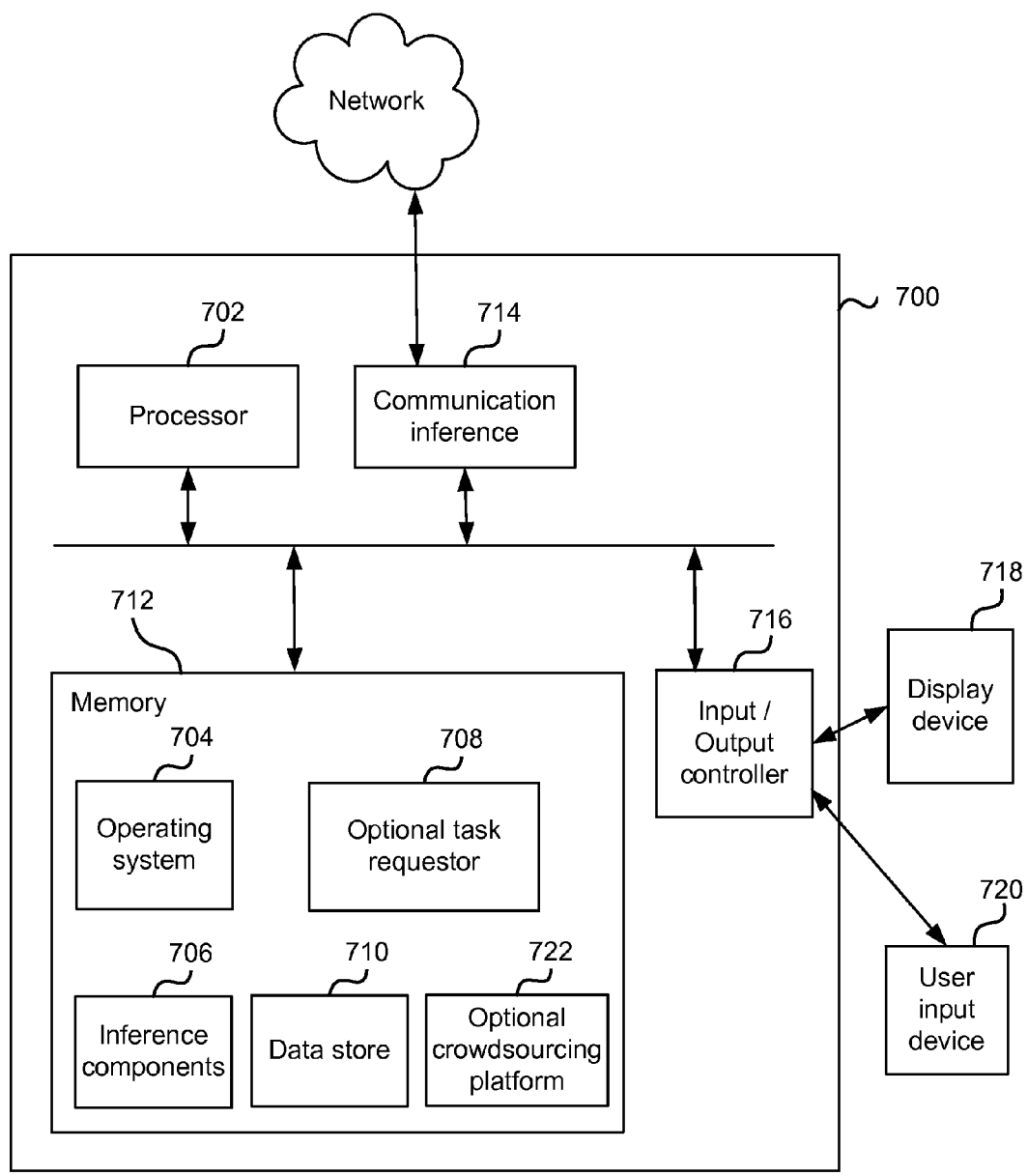
FIG. 7 illustrates an exemplary computing-based device in which embodiments of inference components, optionally with a crowdsourcing platform and task requestor may be implemented.

FIG. 7 illustrates various components of an exemplary computing-based device 700 which may be implemented as any form of a computing and/or electronic device, and in which embodiments of any of the methods described herein may be implemented.

Computing-based device 700 comprises one or more processors 702 which may be microprocessors, controllers or any other suitable type of processors for processing computer executable instructions to control the operation of the device in order to do any of: aggregate crowdsourced labels, learn characteristics of worker communities, learn community memberships of workers, learn an optimal number of worker communities in a crowd of workers. In some examples, for example where a system on a chip architecture is used, the processors 702 may include one or more fixed function blocks (also referred to as accelerators) which implement a part of the methods described herein (rather than software or firmware). Platform software comprising an operating system 704 or any other suitable platform software may be provided at the computing-based device to enable application software to be executed on the device. In an example computing-based device 700 may further comprise a task requestor 708 arranged to generate and submit human intelligence tasks to a crowdsourcing platform. The computing-based device may comprise inference components 706 for carrying out machine learning as described herein. The computing-based device may comprise a crowdsourcing platform 722 to issue tasks to workers and to receive answers. Data store 710 may store data observed by the crowdsourcing platform, data learnt by the inference components, parameter values, inference algorithms and other data.

The computer executable instructions may be provided using any computer-readable media that is accessible by computing based device 700. Computer-readable media may include, for example, computer storage media such as memory 712 and communications media. Computer storage media, such as memory 712, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 712) is shown within the computing-based device 700 it will be appreciated that the storage may be distributed or located remotely and accessed via a network or other communication link (e.g. using communication interface 714).

The computing-based device 700 also comprises an input/output controller 716 arranged to output display information to a display device 718 which may be separate from or integral to the computing-based device 700. The display information may provide a graphical user interface. The input/output controller 716 is also arranged to receive and process input from one or more devices, such as a user input device 720 (e.g. a mouse, keyboard, camera, microphone or other sensor). In some examples the user input device 720 may detect voice input, user gestures or other user actions and may provide a natural user interface (NUI). This user input may be used to input answers to tasks, specify tasks, specify inference algorithms, input graphical models, set parameter values and for other purposes. In an embodiment the display device 718 may also act as the user input device 720 if it is a touch sensitive display device. The input/output controller 716 may also output data to devices other than the display device, e.g. a locally connected printing device.

Any of the input/output controller 716, display device 718 and the user input device 720 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, RGB camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A computer-implemented method of labeling items comprising:
   issuing, over a communications network, a labeling task to a plurality of workers participating in a crowdsourcing system;
   receiving, over the communications network, labels assigned to the issued labeling task by two or more of the plurality of workers;
   sending the received labels and task data to inference components arranged to jointly infer both worker characteristics and characteristics of worker communities of which the two or more workers are members, by assuming relationships between the two or more workers; and
   receiving inference results from the inference components, the inference results comprising an aggregated label for the labeling task, the aggregated label taking into account the inferred worker characteristics and the inferred characteristics of the worker communities, wherein the inference components are configured to further carry out an inference to update probability distributions representing belief about latent variables representing the characteristics of the worker communities, the worker characteristics and the aggregated label.

2. A method as claimed in claim 1, wherein the receiving the inference results further comprises receiving inferred characteristics of the worker communities and using the inferred characteristics of the worker communities to select workers from the plurality of workers for a future task.

3. A method as claimed in claim 1, wherein the receiving the inference results further comprises receiving uncertainty information associated with the inference results and using the uncertainty information to identify future task and worker combinations to issue.

4. A method as claimed in claim 1, wherein the receiving the inference results further comprises receiving the inferred characteristics of the worker communities and using the inferred characteristics of the worker communities to select workers from the plurality of workers for training.

5. A method as claimed in claim 1, wherein the receiving the inference results further comprises receiving a probability distribution describing belief about a value of an aggregated label.

6. A method as claimed in claim 1 wherein the sending the received labels and task data to the inference components further comprising relating the characteristics of the worker communities to the worker characteristics through an addition of noise.

7. A method as claimed in claim 1, wherein the carrying out the inference includes using inference algorithms implementing either variational message passing or Expectation Propagation.

8. A method as claimed in claim 1, wherein the carrying out the inference includes using inference algorithms compiled from a probabilistic graphical model.

9. A method as claimed claim 1, wherein the latent variables representing the characteristics of the worker communities and the worker characteristics comprise confusion matrices.

10. A method as claimed claim 1, further comprising using prior knowledge to inform the inference at the inference components, the prior knowledge comprising one or more of: a number of the worker communities or composition of the worker communities.

11. A method as claimed in claim 1, wherein the inference components utilize inference algorithms compiled from a probabilistic graphical model, the probabilistic graphical model being divided into a plurality of sub-models, such that local inference may be carried out on the basis of each sub-model and the local inference results merged.

12. A method as claimed in claim 11, further comprising carrying out an inference at the inference components using parallel processing of the sub-models.

13. A method as claimed in claim 1, further comprising:
    inferring a characteristic of a worker based on a characteristic of a worker community of which the worker is a member.

14. A computer-implemented method of labeling items comprising:
    issuing, over a communications network, a labeling task to a plurality of workers participating in a crowdsourcing system;
    receiving, over the communications network, labels assigned to the issued labeling task by two or more of the plurality of workers;
    carrying out an inference using the received labels and task data to jointly infer both worker characteristics and characteristics of worker communities of which the two or more workers are members, by assuming relationships between the two or more workers and by relating the characteristics of the worker communities to the worker characteristics through an addition of noise; and
    inferring an aggregated label for the task, the aggregated label taking into account the inferred worker characteristics and the inferred characteristics of the worker communities.

15. A crowdsourcing system comprising:
    a communication interface arranged to issue, over a communications network, a labeling task to a plurality of workers participating in the crowdsourcing system, and to receive, over the communications network, labels assigned to the issued labeling task by two or more of the plurality of workers; and
    a processor arranged
        to send the received labels and task data to inference components arranged to jointly infer both worker characteristics and characteristics of worker communities of which the two or more workers are members, by assuming relationships between the two or more workers, wherein the inference components utilize inference algorithms compiled from a probabilistic graphical model, the probabilistic graphical model being divided into a plurality of sub-models, and wherein the inference is carried out utilizing the plurality of sub-models, and
        to receive inference results from the inference components, the inference results comprising an aggregated label for the labeling task, the aggregated label taking into account the inferred worker characteristics and the inferred characteristics of the worker communities.

16. A crowdsourcing system as claimed in claim 15, wherein the processor is further arranged to select workers from the plurality of workers for a future task based at least on the characteristics of the worker communities.

17. A crowdsourcing system as claimed in claim 15, wherein the processor is further arranged to select workers and generate tasks based at least on certainty of the characteristics of the worker communities.

18. A crowdsourcing system as claimed in claim 15, wherein the processor is further arranged to select worker communities for training based at least on the characteristics of the worker communities.

19. A crowdsourcing system as claimed in claim 15, wherein the inference components are at least partially implemented using hardware logic selected from one or more of: a field-programmable gate array, a program-specific integrated circuit, a program-specific standard product, a system-on-a-chip, a complex programmable logic device, or a graphics processing unit.

20. A system, comprising:
    a communication interface arranged to issue, over a communications network, a labeling task to a plurality of workers participating in the crowdsourcing system, and to receive, over the communications network, labels assigned to the issued labeling task by two or more of the plurality of workers; and
    a processor arranged to
        cause inference components to jointly infer both worker characteristics and characteristics of worker communities of which the two or more workers are members, based on the received labels and task data and by assuming relationships between the two or more workers, wherein the inference components are further configured to relate the characteristics of the worker communities to the worker characteristics through an addition of noise, and
        receive inference results from the inference components, the inference results comprising an aggregated label for the labeling task, the aggregated label taking into account the inferred worker characteristics and the inferred characteristics of the worker communities.

21. A system, comprising:
    a communication interface arranged to issue, over a communications network, a labeling task to a plurality of workers participating in the crowdsourcing system, and to receive, over the communications network, labels assigned to the issued labeling task by two or more of the plurality of workers; and
    a processor arranged to cause inference components to jointly infer both worker characteristics and characteristics of worker communities of which the two or more workers are members, based on the received labels and task data and by assuming relationships between the two or more workers, and receive inference results from the inference components, the inference results comprising an aggregated label for the labeling task, the aggregated label taking into account the inferred worker characteristics and the inferred characteristics of the worker communities, wherein the inference components are further configured to update probability distributions representing belief about latent variables representing the characteristics of the worker communities, the worker characteristics and the aggregated label.

22. A computer-implemented method of labeling items comprising:

issuing, over a communications network, a labeling task to a plurality of workers participating in the crowd-sourcing system;

receiving, over the communications network, labels assigned to the issued labeling task by two or more of the plurality of workers;

sending the received labels and task data to inference components arranged to jointly infer both worker characteristics and characteristics of worker communities of which the two or more workers are members, by assuming relationships between the two or more workers, wherein the inference components utilize inference algorithms compiled from a probabilistic graphical model, the probabilistic graphical model being divided into a plurality of sub-models, and wherein the inference is carried out utilizing the plurality of sub-models; and receiving inference results from the inference components, the inference results comprising an aggregated label for the labeling task, the aggregated label taking into account the inferred worker characteristics and the inferred characteristics of the worker communities.

* * * * *